Aug. 28, 1962 V. L. R. JAMES ET AL 3,050,937
REVERSIBLE THRUST JET ENGINES AND CONTROLS THEREFOR
Filed June 9, 1958 9 Sheets-Sheet 1

INVENTORS.
VARNELL L. R. JAMES
RAYMOND E. PEARSON
BY Reynolds, Beach & Christensen
ATTORNEYS

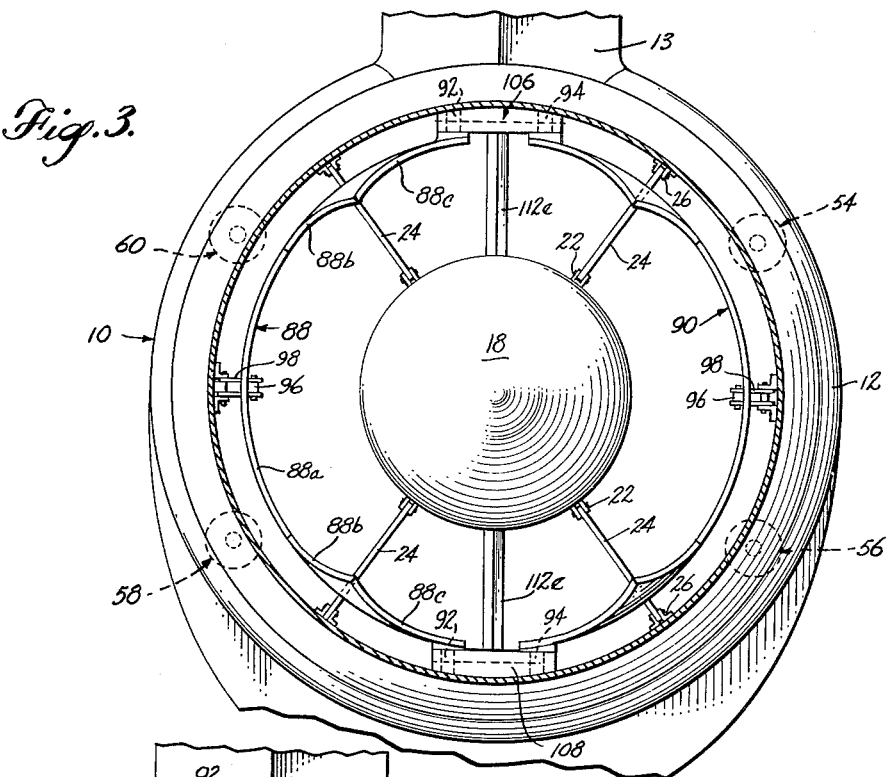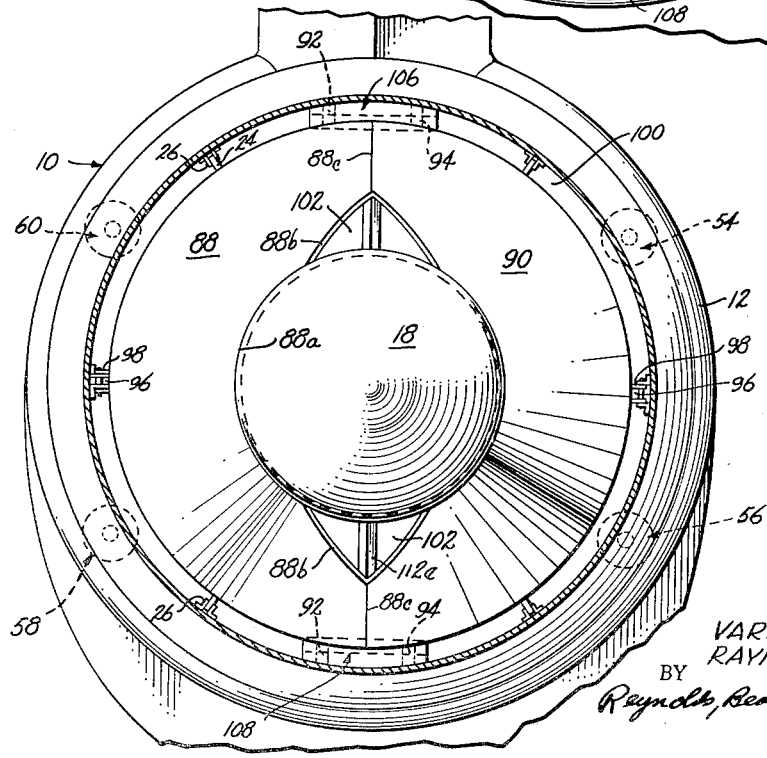

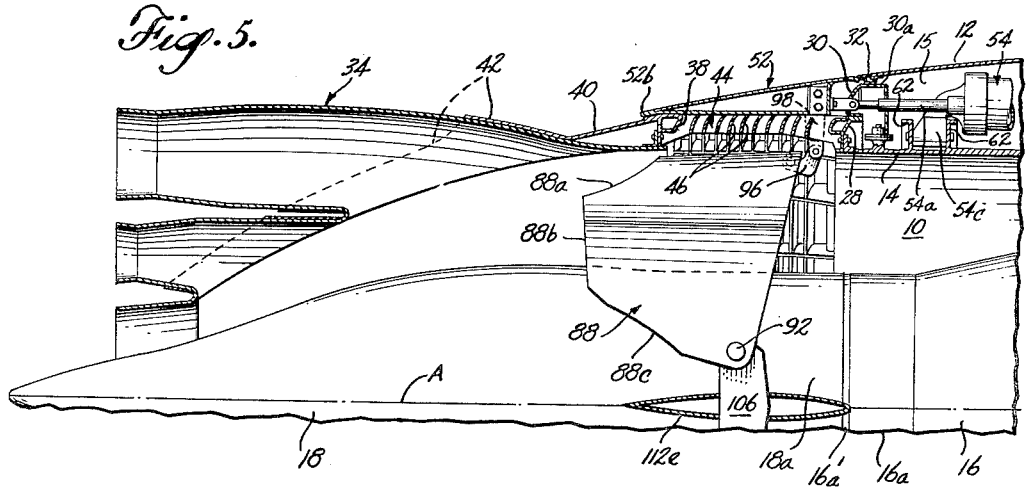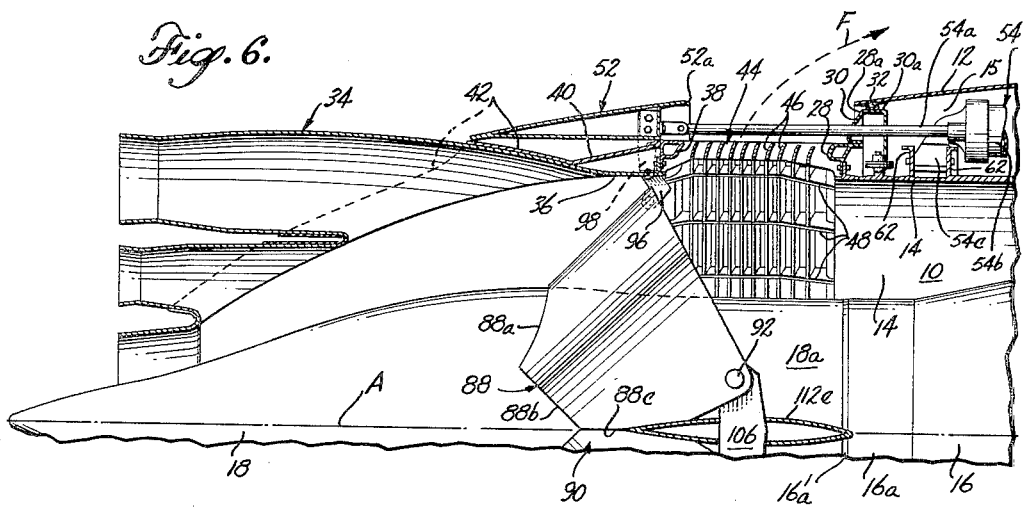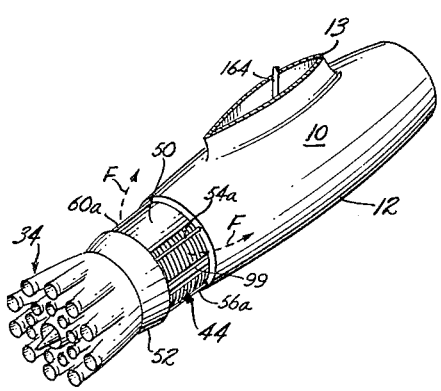

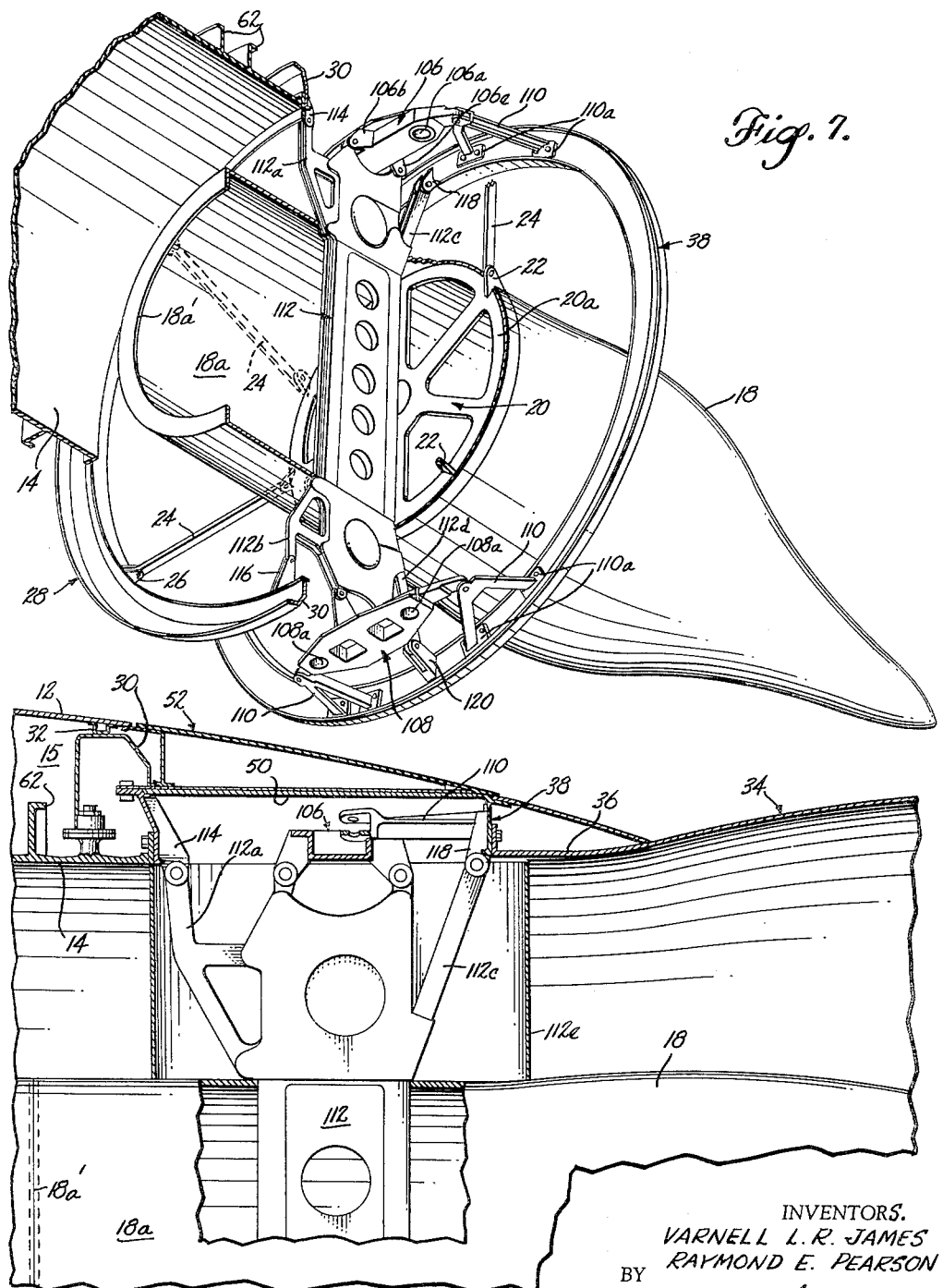

INVENTORS.
VARNELL L. R. JAMES
RAYMOND E. PEARSON
BY
Reynolds, Beech & Christensen
ATTORNEYS

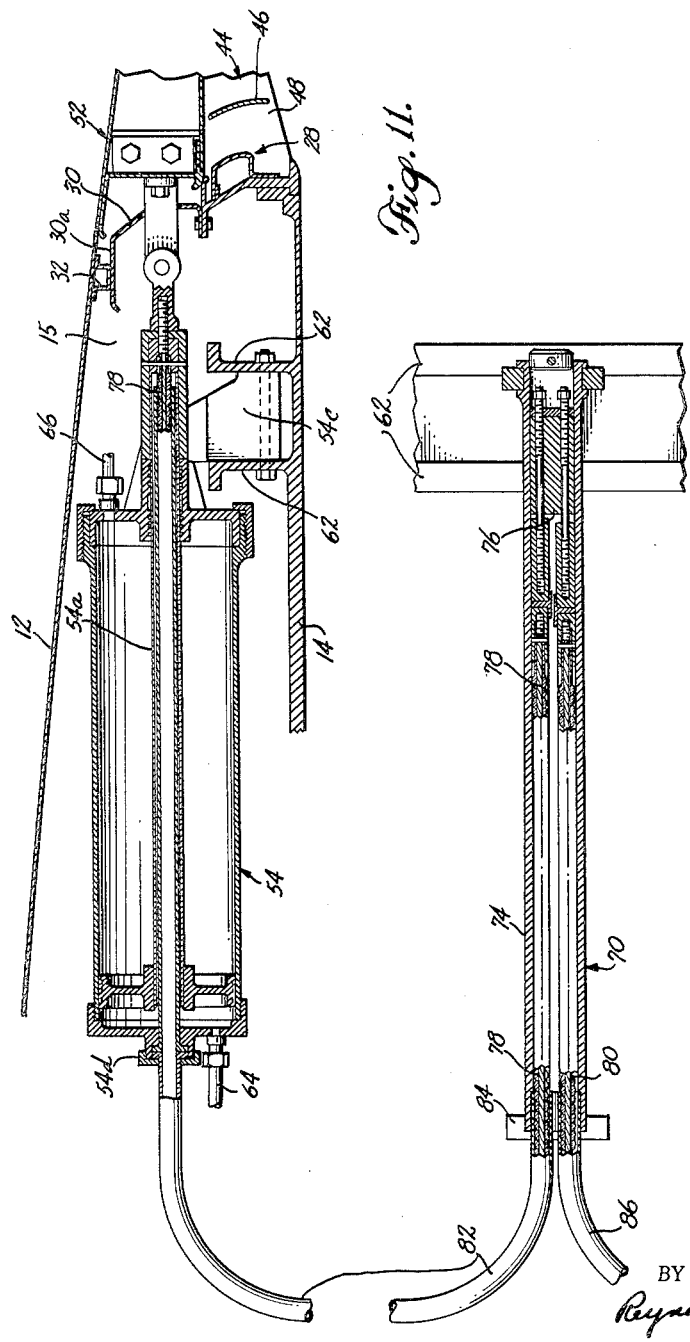

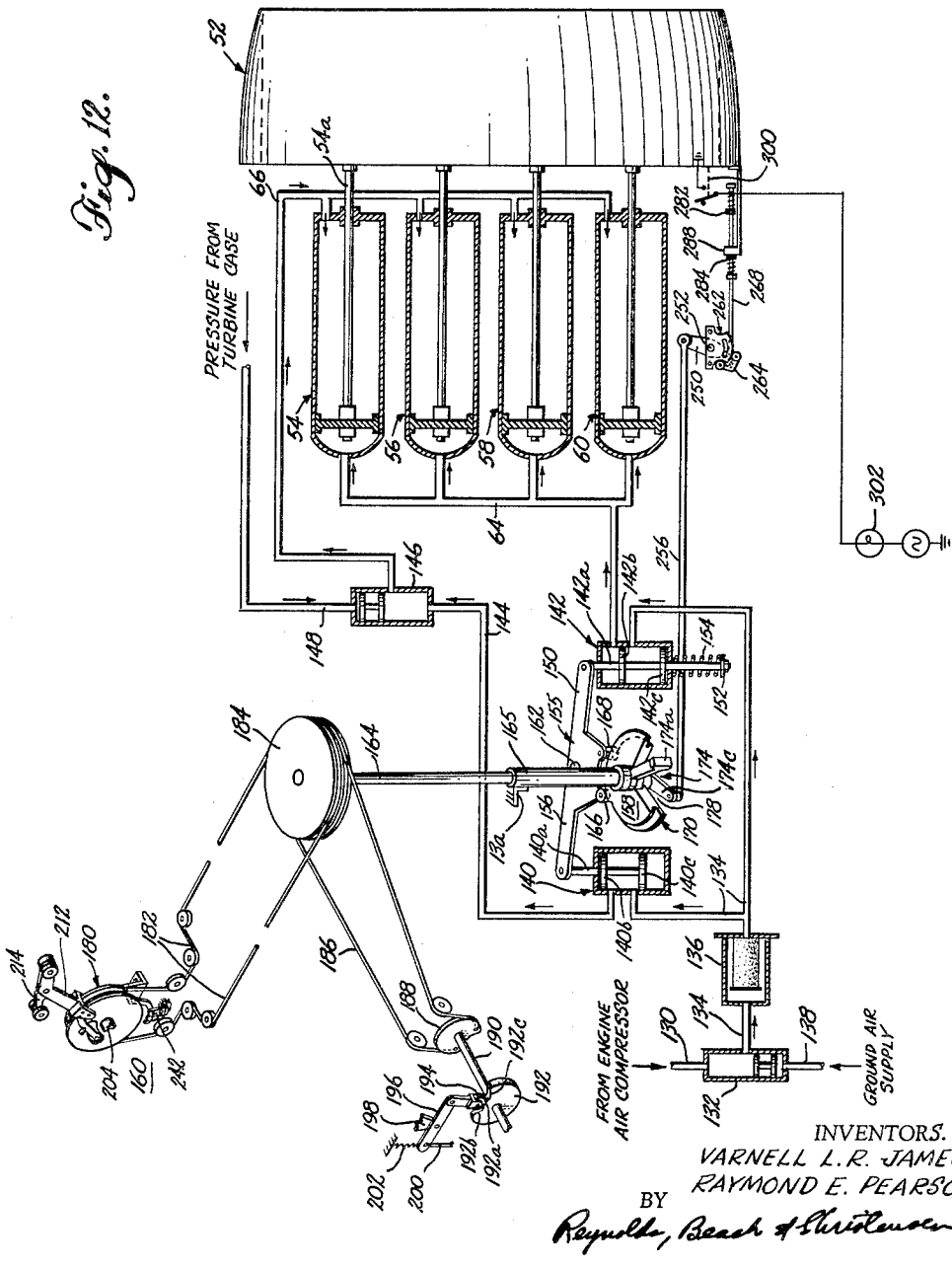

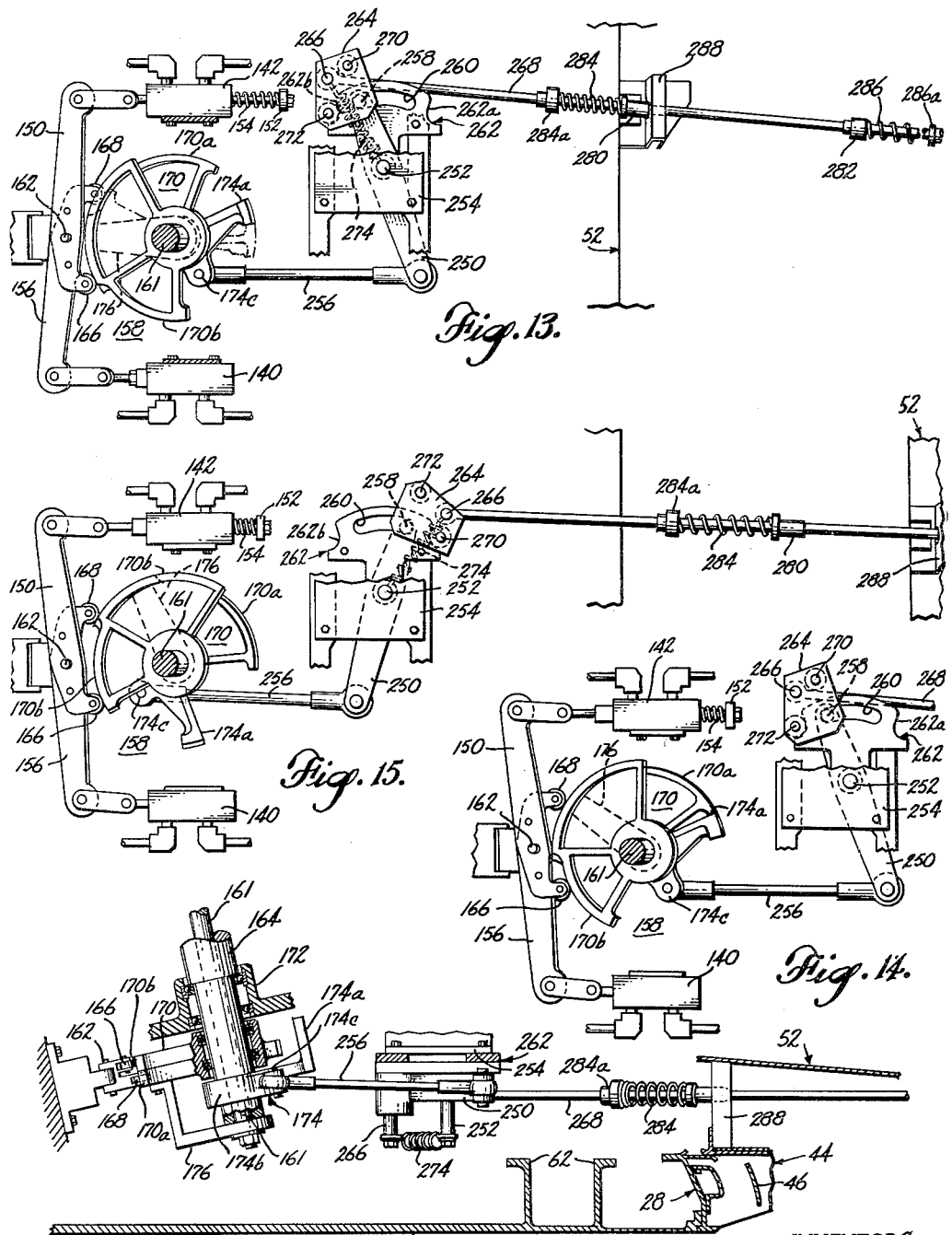

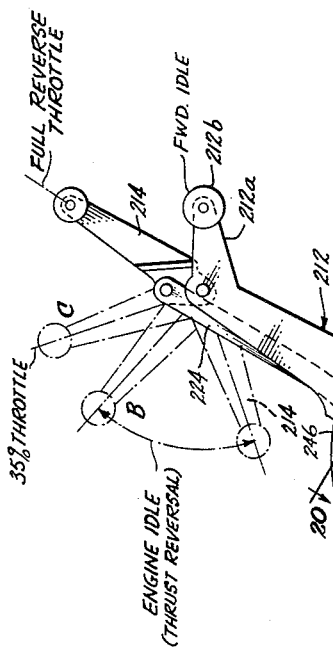

3,050,937
REVERSIBLE THRUST JET ENGINES AND
CONTROLS THEREFOR
Varnell L. R. James and Raymond E. Pearson, Seattle, Wash., assignors to Boeing Airplane Company, Seattle, Wash., a corporation of Delaware
Filed June 9, 1958, Ser. No. 740,721
17 Claims. (Cl. 60—35.54)

This invention relates to improvements in jet engines and particularly in reversible-thrust nozzle structures and controls for such engines. A broad object hereof is to provide safe, reliable, efficient and relatively light-weight reversible-thrust jet engine nozzles and controls suitable for passenger airplane applications. The invention is herein illustratively described by reference to the presently preferred form thereof; however, it will be recognized that certain modifications and changes therein with respect to details may be made without departing from the essential features involved.

One of the potential dangers in any aircraft jet engine having power operated thrust reversing mechanism is that the reversing mechanism may sometime operate fortuitously, without any change in the setting of the pilot's control. The consequences of this during take-off, for instance, will be self-evident, even if it happens to only one engine of a multiengine airplane. An object of this invention is to provide against this contingency. This is done by automatically throttling down the engine to idle speed in the event of a fortuitous operation of the thrust reversing mechanism.

It is also an object to provide against the possibility of a mechanical failure occurring in the connections between the thrust reversing nozzle elements and the power mechanism for actuating the same. This the invention accomplishes by providing thrust reverser elements which when freed of mechanical positioning forces are driven inherently toward their retracted or forward-thrust position by the force of the discharging gases.

Similarly, it is a specific object herein to protect against the danger of spinning a multiengine airplane or speeding up an airplane by fortuitously caused restoration of forward thrust when the engine is being relied upon for reverse-thrust braking. Accordingly, the invention provides a means for automatically reducing engine power to a low value (such as thirty-five percent of full thrust) should the thrust reversing elements for any reason move toward retracted (forward-thrust) position with the pilot's control still set in the reverse-thrust position. Correspondingly, should the reverser elements fail to extend completely in compliance with the corresponding setting of the pilot's control the mechanism automatically prevents the pilot, who may be otherwise unaware of the failure, from increasing power delivery by the engine.

Thus, the invention is concerned in part with providing mechanism which assures the pilot that an engine will not develop a substantial reverse thrust when the setting of his controls calls for forward thrust, nor will it develop substantial forward thrust with the setting of his controls calling for reverse thrust. With these provisions the worst situation with which he must cope in the event of a control system failure in flight, as mentioned above, would be similar to the loss of an engine (e.g., three-engine operation in the case of a four-engine airplane).

The foregoing discussion of certain objects of the invention deals primarily with danger conditions that could arise due to failures in the reversible nozzle or in the actuating mechanism for the nozzle. In addition there are certain dangers, or conditions of serious misoperation at least, which could arise for different reasons due to misoperation of the pilot's controls. For example, should the pilot, during landing, attempt to reverse the thrust of an engine too quickly, with the engine still operating at high speed either of two things might happen: (1) the development of high forward thrust on one engine if its nozzle reverser failed to operate, giving rise to difficult aircraft control due to asymmetrical power in the case of multiengine aircraft, or (2) engine surge due to rapid deceleration and acceleration of the engine (Bodie acceleration) before the secondary fuel manifold could drain sufficiently.

In light of this, a further object of this invention is to provide automatic mechanism preventing operation of the pilot's thrust reversing controls to retract (i.e., to forward-thrust position) the thrust reversing nozzle elements, until such time as the engine throttle lever has first been moved to the idle position. A specific object is to permit power-increasing movement of the pilot's control, but only to a limited degree, during operation of the thrust reversing mechanism to extend (i.e., to reverse-thrust position) the reverser elements; and to permit attaining full reverse throttle only when those elements have substantially reached the extended position. The reason for permitting the pilot to increase power of the engine to a limited degree during the shift to reverse thrust is to minimize any delay entailed in building up full reverse thrust after the reversers have extended, which can be very important during emergency braking.

Similarly, the invention is directed to the provision of means preventing the pilot from moving his power control to a high forward thrust position until such time as the thrust reverser elements have been fully retracted. In a single-engine aircraft, take-off is thereby precluded until the engine is prepared for forward operation, whereas in a multiengine aircraft the pilot will be warned that one of the engines is not yet ready for take-off.

A further specific object is the provision of a practical, efficient and reliable coordination or interlock mechanism achieving the foregoing objectives.

Still other objects relate to the provision of a sound and light weight thrust reversing nozzle structure of the type employing pivoted "clamshell doors" or baffles located forwardly of the orifice choke plane for reversing engine thrust by obstructing rearward flow and directing flow laterally outwardly through side ports opened at that time in the nozzle wall. Flow guides direct the outward flow in a forward direction to reverse the direction of thrust. In such an arrangemnet difficult structural problems arise in supporting and assuming the dynamic loads acting upon the thrust reverser clamshell doors, as well as on the nozzle structure aft of the ports. These problems arise in part from the weakening of the already lightweight nozzle wall by the provision of thrust reversing parts therein. Further, the arcuately shaped clamshell doors are subjected to collapsing forces which, because of their light-weight construction, must be assumed by their supports associated with the nozzle wall. All loads must be properly distributed forwardly to the engine frame. Retention of structural form and operating relationships throughout widely variable temperatures, and maintenance of substantially constant nozzle discharge opening throughout such temperature variations and throughout movement of the nozzle reverser elements are further problems met by the improved nozzle structure.

In accordance with this invention an interlock between the thrust-reversing mechanism in the nozzle and the combined engine power and thrust-reversing controls prevents objectionable engine power increase during transitional movement of the nozzle reverser elements in either direction. Such interlock in its preferred form comprises pilot operated reverser cam means arranged to operate the thrust-reversing mechanisms, said cam means itself being operated conjointly with an engine cam mechanism for controlling engine power. The engine cam has a predetermined range of movement including an intermediate control range (idle). The reverser control cam only produces motion to position reverser control elements during the phase corresponding to engine cam intermediate control range (idle). Conjointly actuated engine power controls increase engine power with movement of said engine cam means in either direction from an intermediate (engine idle) region in the vicinity of and preferably including said control range. The interlock further comprises stop means having a first control position wherein power-increasing movement of the engine cam means is limited at a point on one side of said control range, and an alternate control position limiting speed-increasing movement of the engine cam means at a point on the opposite side of said control range. Actuated by feedback from a nozzle reverser element, the stop means are moved from one position to the other by nozzle thrust reversal in one sense or the other. Lost-motion in the feedback connection permits substantial completion of thrust reversing movement of the nozzle elements before the position of the stop means is changed in order to permit increasing engine power. Moreover, by reaction of such feedback-actuated stop means against the reverser control cam means, a nozzle system failure causing uncontrolled reversal of the nozzle reverser elements automatically actuates the engine cam-coordinated engine power controls for effecting a reduction of engine power.

In the illustrative nozzle embodiment the jet stream flows through an annular duct having opposite side ports or nozzles which are normally closed by a sleeve door. Pivoted clamshell doors or baffles, when retracted in the forward thrust setting, lie adjacent to the duct wall substantially parallel to the gas flow and at least partially close the side ports, and when extended block the rearward flow at a point aft of the side ports but forwardly of the choke point of the nozzle proper. At the same time, the ports are opened by movement of the clamshell doors and of the sleeve door, and the clamshell doors, blocking aft flow of gases, then force the gases laterally outward through such side ports, the latter having vanes or louvers which deflect the discharge forwardly to produce reverse thrust. Mechanical coupling between the sleeve door and the clamshell doors permits their conjoint actuation so that reclosure of the sleeve door automatically resets the nozzle for forward thrust and so that during transitional movements of the clamshell doors and sleeve door, total nozzle opening, hence engine loading, remains approximately constant. Pivoting of the arcuately formed clamshell doors about transverse axes situated forwardly of their centers of gas pressure causes automatic pressure biasing of the clamshell doors toward the open or forward-thrust position, providing at least partial recovery of forward thrust in the event of a mechanical or nozzle system failure. Location of the clamshell doors forwardly of the choke plane of the nozzle offers the important advantage of higher efficiency in the reverse thrust setting, inasmuch as the gas flow is more readily obstructed and diverted with minimum energy loss at low velocity than it is at materially higher velocity.

Further, double-acting pneumatic jacks operatively connected to circumferentially spaced points on the sleeve door and controlled by the actuating cam means are Bowden wire cross-coupled to insure jack coordination, preventing any tendency to cant the sleeve door and insuring operativeness of the door and baffles despite a failure of one of the jacks. An additional safety feature resides in the provision of an auxiliary pressure source for operating the jacks, namely a point of inherently available gas or air pressure in the engine or nozzle, separate from the normal source which is preferably the engine compressor, and an automatic shuttle valve for connecting in the auxiliary source and isolating the normal source in the event of a pressure failure through the normal channel.

Structurally, loads imposed by the pivoted clamshell doors and by the nozzle aft of the side ports are borne and transmitted forward for distribution to loadable points in the engine frame by a novel construction, wherein the nozzle duct itself, weakened by the presence of the port openings, and desirably of light-weight construction, is incapable, without distortion, of bearing and transmitting the entire complex of load forces developed, including static and operational forces as well as those due to the stresses from variant temperatures. According to the illustrative embodiment a vertical trans-duct strut or strongback interconnects annular duct wall stiffeners situated both fore and aft of the side ports.

Pillow blocks for the clamshell door journals are mounted on opposite ends of the strut and are also connected to one of the annular wall stiffeners. Rearwardly directed loads of the clamshell doors are thereby distributed to the wall stiffeners, thence to the engine frame, while gas forces tending to collapse the arcuately formed clamshell doors are resisted by compression loading of the strut; and relative spreading forces on the frame assembly produced by gas pressure on the fixed blockage in a vertical plane in extended position largely counteract each other through the interconnecting strut. In either instance undue strain in the nozzle walls is avoided, as are concentrated loadings on the nozzle wall and engine frame.

These and other features, objects and advantages of the invention will become more fully evident from the following description by reference to the accompanying drawings.

FIGURE 3 is a rear view of the nozzle installation as depicted in the setting shown in FIGURE 1.

FIGURE 4 is a rear view of the nozzle installation as depicted in the setting shown in FIGURE 2.

FIGURE 5 is a somewhat simplified fragmentary longitudinal sectional top view illustrating a portion of the nozzle structure as in FIGURE 1.

FIGURE 6 is a somewhat simplified fragmentary longitudinal sectional top view illustrating a portion of the nozzle structure as in FIGURE 2.

FIGURE 6A is a simplified small-scale view of the engine installation, showing the sleeve door in its extended position for producing reverse thrust, as indicated by the arrows.

FIGURE 7 is a front perspective view showing a skeletal structural combination comprised in the nozzle construction.

FIGURE 8 is a fragmentary longitudinal sectional view illustrating at somewhat larger scale certain details pertaining to the nozzle construction of FIGURE 7.

FIGURE 11 is a sectional detail showing a portion of the nozzle structure, one of the pneumatic jacks, and a portion of a cross-coupling Bowden wire means coordinating a pair of the jacks.

FIGURE 12 is a simplified schematic diagram showing the engine control system, including the engine power controls and coordinated thrust reverser controls, and portions of the mechanism operated thereby.

FIGURE 13 is a simplified drawing of the reverser actuating mechanism, including the interlock means, the parts being positioned to correspond to the forward-thrust setting of the nozzle and the idle-power setting of the engine power controls.

FIGURE 14 is a view similar to FIGURE 13, with the nozzle still in its forward-thrust setting but with the controls now calling for thrust reversal, the engine power being limited by stop means at a predetermined safe speed below full power, pending attainment of the reverse thrust position by the nozzle.

FIGURE 15 is a view similar to FIGURE 13, with the nozzle and engine in full reverse thrust.

FIGURE 16 is a sectional detail showing the interlock mechanism and associated elements of structure.

FIGURE 17 is a simplified side view of the pilot's engine control stand, with the parts being shown by solid lines in the full-power forward-thrust setting of the controls, and by broken lines in the idle forward-thrust position.

FIGURE 18 is a sectional detail taken on line 18—18 in FIGURE 17, showing the setting of a latch in the solid-line position of FIGURE 17.

FIGURE 19 is a view similar to FIGURE 17 with the parts shown by solid lines in the full-speed reverse-thrust setting, and, by successive broken-line positions, in the process of reversing thrust.

FIGURE 20 is a sectional detail taken on line 20—20 in FIGURE 19, showing the latch in the solid-line position of FIGURE 19.

Figures 1, 2:
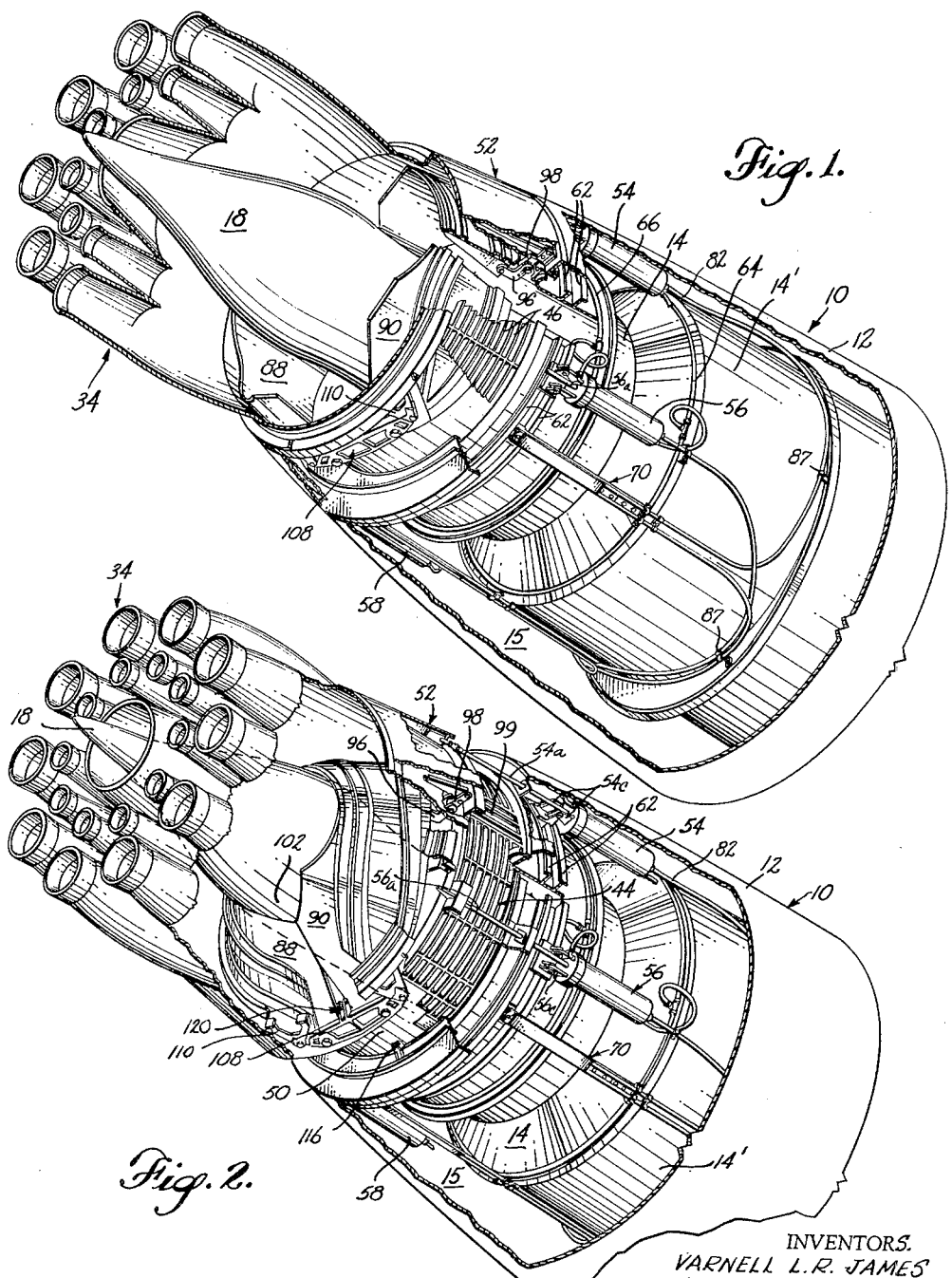
FIGURE 1 is a rear perspective view of the illustrative reversible-thrust noise suppression nozzle mounted on a typical engine structure, parts being broken away for purposes of illustration and the nozzle being shown in its forward-thrust setting.
FIGURE 2 is a similar view with the nozzle shown in its reverse-thrust setting.
Figure 9:
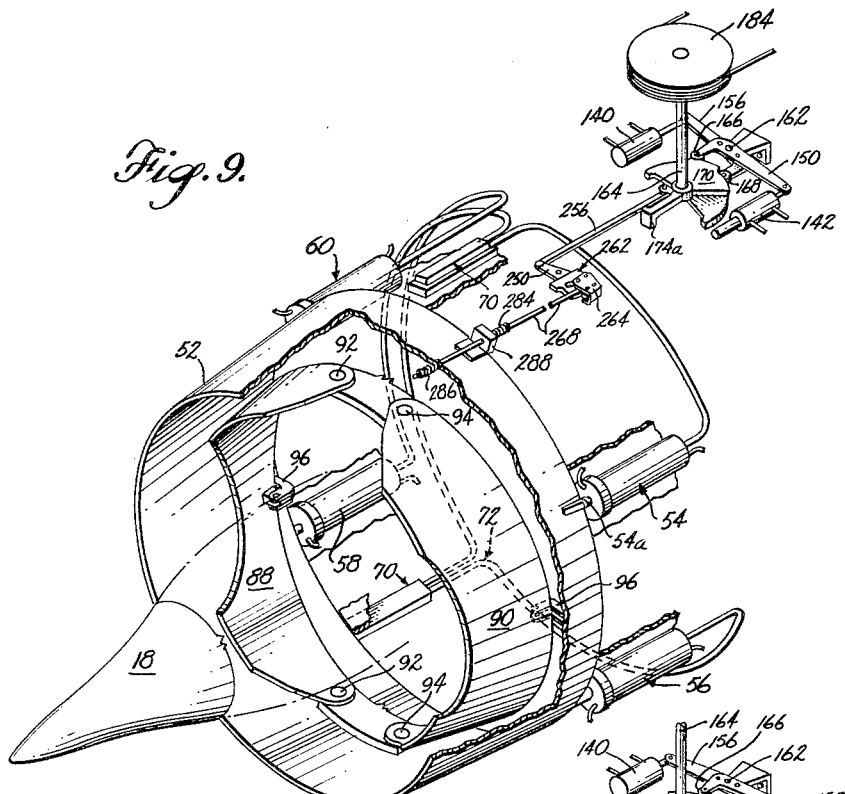
FIGURE 9 is a simplified and partially schematic perspective view showing the reversible nozzle and its actuating means, with the reverser elements in the forward-thrust setting.
Figure 10:
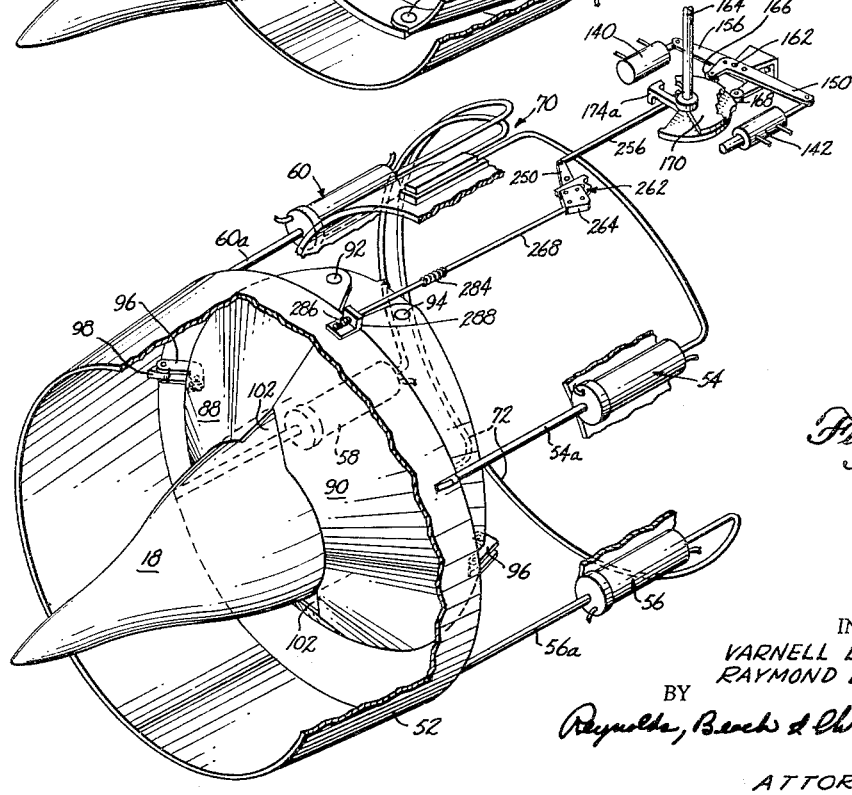
FIGURE 10 is a view similar to FIGURE 9 with the reverser elements in the reverse-thrust setting.

Referring to the drawings, first the nozzle and associated engine structure and then the mechanism and controls for operating the nozzle and the engine will be described. The nozzle and associated engine structure appear principally in FIGURES 1 to 8, inclusive. In these figures, with the exception of FIGURE 6A, only a portion of the engine proper is illustrated. The engine is generally designated 10, comprising the generally cylindrical cover of shell 12 of usual form which surrounds and is spaced outwardly from the combustion liner 14, with an annular space 15 formed therebetween housing various items of equipment. The liner is enlarged at 14' to house the turbine (not shown). A mounting strut 13 at the top suspends the engine beneath the airplane wing and affords a service and control duct for the engine. An island 16 supported centrally within the combustion liner 14 extends rearwardly from the turbine hub (not shown) and terminates in a cylindrical section 16a of substantially constant diameter, having an inturned lip 16'a. The tail cone or plug 18, which in this case extends rearwardly through and forms a part of the nozzle proper, is joined to the island by a cylindrical section 16a on the forward end of the tail cone, which section telescopes slidably within the island section 16a. Thermal contraction and expansion of the tail cone and island lengthwise is permitted by this telescoping joint, without developing undue stresses in the nozzle or engine structure.

The plug is supported and held against rearward expulsion by gas pressures by the incorporation of a stiffener spider 20 having an annular rim 20a welded or otherwise secured to the tail cone wall internally thereof at a location to the rear of the rearward terminus of the combustion liner 14, with tabs 22 projecting outwardly from the tail cone wall as shown. Connecting links 24 extend radially outwardly and forwardly from the tabs 22 to tabs 26 projecting inwardly from the annular stiffener 28. The latter extends around and reinforces the rearward end of the combustion liner 14 to which it is connected as shown. In the illustration four such links 24 interconnect the tail cone and the engine frame stiffener 28. There is an internal stiffener flange 18'a on the forward end of the cylindrical section 18a.

In order to support the aft end of outer shell 12 properly spaced around the combustion liner, an annular seal 30 comprising a formed sheet metal section is mounted on the stiffener ring 28. The annular seal 30 has a cylindrical outer surface 30a against which rests in sliding contact a contact rib 32 extending around the interior of the lip of the shell 12. Except for openings through which the pneumatic jack rods extend, the space 15 between the combustion liner 14 and the outer shell 12 is closed off at the rearward end of the engine by means of the contiguous contact between the ring structure 28, the seal 30 and the bearing rib 32. Slidable contact of the bearing rib 32 on seal surface 30a permits differential longitudinal expansion and contraction between the combustion liner and the shell 12 caused by varying temperatures.

Preferably the nozzle orifice unit 34 is of the noise suppression multitubular form according to the teachings of the patent application Serial No. 678,862, filed August 19, 1957, now abandoned, in the name of Merle B. McKaig, and the improvements disclosed in patent application Serial No. 690,357, filed October 15, 1957, now abandoned, by the same applicant. In this unit the ring clusters of discharge tubes which surround the tail cone 18 are supported by a rearwardly tapering annular duct 36, which, at its forward end, is joined to an annular stiffener 38. An outer fairing ring 40 joined to the outer and aft edge of the stiffener 38 extends inwardly and rearwardly therefrom and joins with a jacketing mandrel 42 which envelops the clusters of orifice tubes in the nozzle, in order to strengthen these light gauge metal tubes near their roots where stresses are greatest. Choking of the gas flow takes place in the rearwardly tapered end portions of the discharge tubes, which have convergent-divergent orifices.

The annular stiffeners 28 and 38 are integral parts of an annular louver assembly 44 defining louvered side ports and interposed between the longitudinally separated aft end of the combustion liner 14 and the forward end of the nozzle sound suppressor unit. This louver assembly further comprises the circumferentially extending louvers 46 comprising flat ring slats which are disposed generally in successively spaced planes perpendicular to the engine axis A and which curve outwardly and forwardly so that engine gases escaping between the louvers will be directed at an angle forwardly to produce reverse thrust, as shown by the arrow F (FIGURES 6 and 6A). The louvers are supported by longitudinal ribs 48 interconnecting the ring structures 28 and 38 at circumferentially spaced locations. Cover plates 50 close the top and bottom of the louver structure and interconnect the ring structures 28 and 38. In effect, therefore, the louver assembly 44 constitutes a rearward continuation of the engine frame structure represented by the combustion liner 14, as a mounting and support for the noise suppression nozzle unit 34.

For normal or forward-thrust operation of the engine the side wall ports represented by the louver openings are closed at least partially by the retracted clamshell doors 88 and 90 and sealed by a sleeve door 52 which surrounds the louver assembly and has a forward outer lip 52a adapted to enter the reentrant space 28a defined between the overhanging lip of the cover 12 and the outer portion of the seal ring 30, thereby sealing against escape of gases. The rear end of the sleeve door 52 is curved inwardly slightly at 52b in order to wedge and seal against the forward end of the fairing section 40 in the normal or closed position of the sleeve door.

Rearward extension movement of the sleeve door to the position shown in FIGURE 6 opens the side wall ports in the nozzle. Power actuating mechanism for moving the door between its extended and retracted positions comprises two pairs of pneumatic jacks 54, 56, 58 and 60 of similar construction mounted at circumferentially spaced locations around the combustion liner wall 14 in the space 15. The jack 54, for example, has a rearwardly extending piston rod 54a which passes slidably through apertures in the sealing section 30 and is connected by its outer end to the forward end of the door 52. The aft end of the jack cylinder 54b has a fitting 54c by which it is supported, such fitting being mounted by and between the longitudinally spaced flanges 62 extending around the combustion tube 14 at a location slightly forward of its aft end (FIGURES 5 and 6).

Opposite ends of the pneumatic jack cylinders are supplied with pressure fluid (air or gas) from the same sources through respective conduits 64 and 66, one to effect extension of the sleeve door and the other retraction or closure of such door.

Coordination of the movement of the pneumatic jacks is essential so that the sleeve door will not be canted and tend to bind in its opening and closing movements, which could otherwise occur upon failure of one of the jacks or due to inherent differences in operating speeds of any oppositely situated jacks. To this end the approximately opposite jacks 54 and 58 are cross-coupled by the Bowden wire means 70, while the intermediately situated jacks are cross-coupled by the Bowden wire means 72.

In FIGURE 11 the details of the Bowden wire crosscoupling means for the pair of jacks 54 and 58 are illustrated, the Bowden wire means 72 being similar. Such means comprise a longitudinal tubular casing 74 fixed to the annular ribs 62. A slider 76 is received in this casing. A Bowden wire 78 interconnects the slider 76 and piston rod 54a of the jack 54, and a similar Bowden wire 80 interconnects the slider 76 and the piston rod of the jack 58. The casing 74 extends forwardly from the supporting members 62 and the Bowden wires extend between the slider and the respective jacks in loops which curve from one connecting point forwardly and around the periphery of the combustion liner section 14', thence back to the other connecting point. The Bowden wire 78 is encased in a sheath 82 which is clamped at one end to the cap unit 84 of the casing 74 and at its opposite end to the closure unit 54d of the jack 54. A similar sheath or guide tube 86 is provided for the Bowden wire 80. Suitable fasteners 87 hold the sheath in place around the combustion liner section 14' (FIGURE 1). With this arrangement, extension and retraction of the pneumatic jack 54 is accurately duplicated by like movements of the jack 58, and if either jack should fail or should attempt to operate faster or slower than the other, nevertheless the approximately oppositely situated points on the sleeve door 52 to which the respective piston rods are secured will move fore and aft at the same rate when either such jack operates.

Reversal of thrust is achieved in the nozzle by opening the sleeve door and simultaneously extending a pair of arcuately formed baffle plates 88 and 90 to block rearward discharge of gases at a location aft of the louvered ports exposed by opening of the door. The retracted or forward-thrust position of these baffles is shown in FIGURES 1, 3 and 5 for instance, and their extended or reverse-thrust position in FIGURES 2, 4 and 6. In their retracted position the respective baffle plates extend circumferentially around something less than half the nozzle wall interior and are presented edgewise to the flow of gases through the nozzle so as to impose negligible resistance to flow. In their extended position the substantially semicylindrically formed plates are disposed obliquely to the engine axis A and block off most of the annular flow region just to the rear of the grid structure 44.

The formation and mounting of the clamshell doors 88 and 90 enabling them to function in the described manner presents certain problems of design. Circumferentially opposite ends of the plate 88 are pivotally supported on vertically aligned pivots 92 offset a short distance from the vertical midplane of the nozzle. Similar end pivots 94 are provided for the clamshell door 90, offset by the same distance from the opposite side of such midplane. These pivots are located in the upper and lower forward corners of the respective clamshell doors. In the retracted position (FIGURE 5) the forward edge of each such door extends in a plane which forms a forwardly open acute angle with the longitudinal vertical midplane of the nozzle. An L-shaped link 96 is pivotally connected to the forward edge of baffle plate 88 at a point midway between its ends. This link extends forwardly, thence outwardly to a pivotal connection to a lug 98 which is mounted on and projects radially inward from the forward portion of the sleeve door 92. The louver structure 44 is longitudinally slotted at 99 to permit longitudinal movement of the link, permitting retraction and extension of the sleeve door, and by virtue of the coupling to the baffle plate 88 through the link 96, simultaneous extension and retraction of the clamshell doors. There is a similar slot formation on the opposite side of the louver structure and a similar linkage between the clamshell door 90 and the sleeve door.

The internal wall surface of the louver structure 44 is outwardly bowed longitudinally so as to provide clearance for the forward edges of the clamshell doors in swinging between their extended and retracted positions while permitting the forward position of the extended clamshell doors to lie fairly close to the inside periphery of the duct wall so as to block rearward gas flow effectively, and while permitting the retracted clamshell doors to lie closely adjacent to the nozzle wall in a noninterfering position.

In the extended position of the clamshell doors as in FIGURE 6, effected by extension of the sleeve door 52, the rearward edge of each such plate seats against or lies closely adjacent the surface of the tail cone 18 over an intermediate portion 88a of the circumferential length of the door's rear edge. The rear edge of door 88 has a concavely formed intermediate portion 88a shaped to conform to the surface of the tail cone 18 in the door's extended position, adjoining substantially normal or straight portions 88b which extend substantially in direct circumferential alignment, and beveled inner rear corner portions 88c adapted to abut or lie closely adjacent to the similarly formed corner portions of the plate 90. The clamshell door 90 is similar.

With the clamshell doors extended, as in FIGURES 2, 4 and 6, the design is such that annular leakage area 100 plus effective area of the side ports or reverse nozzles 44 match engine exit area requirements in reverse-thrust position. Moreover, the design is such that the aggregate open area remains approximately constant during transitional movements of the reverser elements comprising the sleeve door and the clamshell doors. By maintaining a substantially constant discharge opening, operation of the engine remains stable during transition from forward to reverse thrust.

An important feature of the mounting and construction of the clamshell doors is the forward corner location of their pivots so that their pivot axes are well forward of the center of gas pressure which acts outwardly upon them in directions non-radial to the pivot axis of each. Thus, if for any reason the mechanical connections fail, or the actuators fail to close the sleeve door and retract the clamshell doors when required for forward thrust, the doors will be blown toward open position and permit at least partial recovery of forward thrust.

While in FIGURES 3 to 6, inclusive, the clamshell doors are shown in a simple flat plate form, it will be recognized that in practice ribbing or other stiffening elements may be provided which enable the clamshell doors to be made of relatively light sheet metal yet possess the required degree of stiffness and form retentivity under the load conditions involved. Certain details of a preferred type of construction appear in FIGURES 1 and 2.

There remains to be described, in connection with the structural aspects of the nozzle, the means by which clamshell door loads and, to some extent, loads imposed by the orifice unit 34, are assumed and are properly transmitted to the engine frame without adding unduly to the weight of the nozzle structure. FIGURES 7 and 8 are directed principally to the illustration of these structural aspects.

As shown, the stiffener ring structures 28 and 38 located at the forward and aft ends of the louver structure represent the principal base frame members for transmitting loads. Diametrically opposite clamshell door pivot pillow blocks 106 and 108 are mounted at top and bottom of the nozzle. These are of elongated form extending in a generally tangential or circumferential direction and incorporate journal holes 106a and 108a at opposite ends offset from opposite sides of the longitudinal vertical midplane of the nozzle as required for the clamshell door pivots 92. Opposite ends of each pillow block are pivotally connected to the forwardly directed apexes of circumferentially extending A-frame supports 110 having foot portions 110a rigidly mounted on the forward side of an annular web comprised in the structural member 38. These A-frames hold the pillow blocks primarily against fore and aft and longitudinal displacement forces. They also provide a limited amount of stiffness against radially directed forces on the pillow blocks.

An elongated generally flat strut or strongback 112 extends across the nozzle in the longitudinal vertical midplane thereof and is supportingly connected by its opposite ends to intermediate locations on the respective pillow blocks 106 and 108. The pillow block 106, for example, has tabs 106b and 106c projecting from opposite sides thereof and connected to elements on the adjacent end of the strongback 112. The pillow block 108 is similarly connected to the opposite end of the strongback. An arm 112a projects forwardly and outwardly from the end of the strongback carrying the pillow block 106 and is secured to a tab 114 on the annulus structure 28. A similar arm 112b on the opposite end of the strongback is connected to tab 116. Arms 112c and 112d project outwardly and rearwardly from the respective ends of the strongback for connection to tabs 118 and 120, respectively, on the structural annulus 38. A streamlining cover 112e encases the strongback 112, over the exposed portions thereof extended between the outer and inner duct walls of the nozzle in order to minimize the resistance of the strut to gas flow. Details of construction of the strut itself may vary, that illustrated representing a typical and preferred arrangement designed for ease of fabrication and lightness of weight with structural strength.

In providing such a strut and its supporting connections to the pillow blocks and to the structural annuli 28 and 38, the main loads imposed by the thrust-reversing baffles 88 and 90 are assumed and transmitted to the engine structure without necessitating a general use of heavy or reinforced duct walls and without encountering serious problems from thermal expansion and contraction in the nozzle structure. Due to the arcuate form of the clamshell doors, and despite their stiffening by the provision of ribs over their outer surfaces, there is a tendency for the clamshell doors to bend in a collapsing sense, drawing their ends toward each other, under the heavy forces of gas acting against their concave sides, particularly in the extended position. Such forces might tend to distort the annular wall of the nozzle if the pivots for the clamshell doors were to be mounted directly on such wall, particularly since the clamshell door pivots are longitudinally located at the openly constructed lower assembly which, if of lightweight design, is not inherently strong enough to resist such loads. However, the strongback 112, though relatively light in weight, acts as an efficient column withstanding the wall-crushing forces of the clamshell doors. Moreover, there is a tendency for the clamshell door members to be blown rearwardly by the forces of the gas, particularly in the extended position thereof or in intermediate positions, and this is resisted not only by the transmission of loads to the annulus 38 through the pillow blocks and A-frames, but also by transmission to the structural annulus 38 through the arms 112c and 112d, and to the structural annulus 28 through the arms 112a and 112b. Additional forces acting on the extended or partially extended clamshell doors are those which tend to force them away from each other, radially outward, due to the oblique incidence of the rearwardly moving gases against their inclined forward surfaces. The pillow blocks 106 and 108 assume these loads directly because the forces referred to in one clamshell door are directed oppositely from those in the other clamshell door, simply loading the pillow blocks in tension.

Turning now to the presently significant portions of the engine and nozzle controls by which the engine throttle and nozzle reverser elements are actuated in coordinated manner as previously mentioned, reference is made particularly to FIGURES 12 to 20, inclusive. Air from the engine compressor (not shown) is delivered through conduit 130 to the three-way shuttle valve 132, thence through conduit 134 to the air filter 136. For ground test purposes, air from an independent source may be delivered through the conduit 138 to the conduit 134 by way of the second inlet in the shuttle valve 132, the shuttle element therein automatically closing off the conduit 130 in that event. Beyond the filter 136 conduit 134 branches to two control valves, 140 and 142. The outlet from valve 142 leads through supply conduit 64 to the ends of the fluid jack cylinders (54, 56, 58 and 60) wherein an increase of pressure effects extension of the sleeve door 52 to the reverse-thrust setting. The outlet from control valve 140 extends through the conduit 144 to one inlet of the three-way shuttle valve 146 whose outlet is connected through conduit 66 to the opposite ends of the pneumatic jack cylinders for effecting retraction of the sleeve door. An emergency fluid pressure source conduit 148 leads to the other inlet of the shuttle valve 146. The emergency pressure source (not shown) may be a point in the compressor, in the turbine casing or some other point at which air or gas under pressure may be available for operating the pneumatic jacks to restore the nozzle reverser elements to the forward-thrust setting in the event of a failure of pressure through the normal supply channel.

The valve 142 comprises a control rod 142a having spaced lands 142b and 142c thereon by movement of which to the illustrated position in FIGURE 12 cuts off the flow of air from conduit 134 to conduit 64, whereas movement to the opposite or upper position of the valve as shown in this figure opens a passage through the valve to these conduits. The control rod 142a extends through opposite ends of the valve casing. One end is connected to an actuating arm 150. The opposite end is provided with a stop 152, and a spring 154 which reacts from one end of the valve casing against the stop in order to bias the valve toward the first-mentioned position wherein the conduits 134 and 64 are isolated from each other. This is done so that certain possible failures in the control mechanism, such as accidental breakage of the lever 150, a break in the conduit 144, etc., will permit the pneumatic actuators to return the sleeve door and reverser clam-shell doors 88 and 90 to the normal or forward-thrust position. Valve 140 has a control rod 140a and spaced lands 140b and 140c thereon, and is connected to be actuated by an arm 156 which is operated conjointly with, but oppositely from, the arm 150, so that when the passage through valve 142 is opened, that through valve 140 is closed, and vice versa. Opening or closing of valve 140 accompanied by closing or opening of valve 142 effects retraction or extension, respectively, of the sleeve door.

The arms 150 and 156 are positioned by cam means 158 operated by the pilot's control 160 through a system of drums and cables. The two arms comprise integral parts of a cam follower unit 155 pivoted at 162 at a location offset from cam positioning shaft 164. This structure along with parts of the pneumatic system may be mounted within the strut 13, with the cam shaft 164 projecting up through the strut to within the wing (not shown). Two follower rollers 166 and 168 are mounted on the cam follower unit 155 at angularly spaced locations engaging a cam unit 170 journaled on a hollow stationary support shaft 165 which is fixed to the strut at 13a (FIGURE 12). The cam control shaft 164 extends coaxially through shaft 165 and at its lower end is drivingly connected to the cam 170 by an arm 176. The cam unit 170 has mutually offset cam surfaces 170a and 170b thereon respectively engaged by the cam follower rollers 168 and 166. A stop unit 174 is also journaled rotatively on shaft 165. This stop unit comprises a part of the interlock mechanism by which different limits may be imposed upon angular movement of the cam unit in accordance with existing position of the thrust reverser elements in the nozzle, as will be explained more fully hereinafter. The reason for journaling the cam and stop units on a separate shaft 165 is primarily one of safety. Should for any reason the stop unit bearing freeze on shaft 165 it will not lock the control shaft 164, hence will not interfere with operation of the engine throttle or nozzle reverser elements by the pilot's control 160.

The cam surfaces 170a and 170b each have a constant-radius lobe and a constant-radius dwell section joined by a step. The steps are angularly spaced by the amount separating the follower rollers 166 and 168. The arrangement is such that rotation of the cam unit 170 in one direction causes the arm 150 to be actuated positively outwardly away from the cam while simultaneously the integral arm 156 is permitted to move inwardly thereof, whereas movement in the opposite direction causes a reverse positive actuation of the arms, thereby operating valves 140 and 142 one way or the other.

A stop element 174a is mounted on an arm that projects radially from the collar portion 174b of the stop unit 174. This stop element is received in a notch or open sector 178 in the cam unit 170 and is adapted to be contacted by the sector edges to limit cam rotation. As previously mentioned the stop unit is part of an interlock system.

However, before describing in detail the interlock by which the positioning of the stop unit 174 is established in accordance with nozzle reverser element position, it is in order to discuss first the nature of the pilot's control and the coordination of shaft 164 with the throttle mechanism of the engine. The pilot's control 160 is usually mounted on a stand carrying other controls, the nature and purpose of which are of secondary concern and will not be described herein. For present purposes the pilot's control for a single engine comprises a drum 180 around which the control cable 182 extends, leading to the remote drum 184 mounted on the upper end of shaft 164 and conveniently situated within the strut 13 or the overlying wing (not shown). Drum 184 rotates shaft 164 as the drum 180 is rotated by the pilot. The drum 184 has a second groove around its periphery occupied by a throttle control cable 186 which extends to a controlled sheave 188 for rotating the throttle cam shaft 190 when the drum 180 is rotated. A throttle control cam 192 is fixed on the shaft 190 and has an intermediate low or dwell region 192a adjoined by rises 192b and 192c, which follow a generally spiral curve outwardly from the ends of the dwell region 192a to the maximum radius of the cam 192. The length of the dwell region 192a and the slopes of the rises 192b and 192c follow a certain design determined by engine fuel requirements. A cam follower 194 is carried by one end of a lever 196 pivoted at 198 and whose opposite end is connected to a rod or other element 200 which actuates the throttle or other fuel supply control means in the engine, determining engine speed. A spring 202 maintains the follower 194 against the cam 192 so that rotation of this cam will vary engine speed. It will be recognized that this illustration of the throttle control mechanism is only schematic and that it may assume various detailed forms. The idle or minimum speed setting of the engine is established with the follower 194 in contact with the dwell region 192a of the cam whereas engine speed is increased progressively to a maximum when the follower is caused to move outwardly on either of the rises 192b or 192c, by rotation of the cam in one direction or the other from the respective end points of the dwell region.

Still with regard to engine power control, the drum 180 is rotatably mounted on a horizontal shaft 204 (FIGURE 17), as may be the corresponding drums, in closely adjacent positions, associated with the controls for the remaining engines of a multiengine airplane. Independently rotatively mounted on the shaft 204 is a circular plate 206 located closely adjacent to one side of the drum 180. A pin 208 projects from the adjacent side of the drum 180 and through an arcuately formed slot 210 in the plate 206. A control arm 212 is rigidly mounted on the plate 206 and projects radially generally upwardly therefrom and on its outer end carries a rearwardly angled handle portion 212a carrying a finger grip 212b of the usual type. At the end of the lever arm 212 a secondary or reversing lever 214 is pivotally mounted at 216 and likewise carries a finger grip 218 on its outer end. The lever 214 has an offset portion 220 which carries a pivot pin 222 connected to the outer end of a generally radially disposed link 224. The inner end of the link 224 is connected to the pin 208 as shown. This has a dog-leg or cam portion 224a which passes through a guide slot 212c formed in the base portion of the lever 212. The pivot pin 222 is so located on the offset portion 220 of the lever 214 that with the lever thrown forwardly and downwardly to its solid-line position of FIGURE 17, directed approximately oppositely from the handle 212a, the pin lies approximately in alignment with the pivot 216 and the pin 208. Consequently, swinging of the lever 212 one way or the other to rotate the plate 206 correspondingly produces direct tension or compression in the link 224 without any tendency to rotate the lever 214 on its pivot 216. Thus, the drum 180 under these conditions is coupled directly to the plate 206 for conjoint rotation therewith. In this position of the lever 214 and link 224 the pin 208 occupies one end of the slot 210. This represents the maximum power setting of the throttle control cam 192 (FIGURE 12) and may be established by a suitable stop 231 on the control stand.

Adjacent the side of the drum 180 opposite the plate 206 is a stationary separator plate 230 which, in a multi-engine aircraft, separates such drum from the next adjacent individual engine control drum. The separator plate 230 carries the stop 231 and an idle-position stop 232 which engages the lever 212 when the latter is drawn rearwardly by the pilot to reduce the engine power to idle (FIGURE 19). This corresponds to rotating the power control cam 192 until the cam follower 194 has descended the shoulder 192c and has just reached the dwell region 192a. With the lever 212 in this position further rotation of the drum 180 in the same direction, hence of the throttle cam 192c, may be effected by swinging the lever 214 in the same direction as that which brought the lever 212 against the stop 232, that is from its solid line position in FIGURE 19. This movement is accompanied by outward movement of the link 224, hence further rotation of the drum 180 in the same direction. Such movement causes the cam follower 194 to traverse the dwell region 192a and also the opposite rise portion 192b in order to increase engine power again to the maximum value. The dwell region of the cam 192c and the corresponding range of positions of the lever 214 are employed for the purpose of actuating the nozzle thrust reverser elements between positions while the engine remains at the idle, and for doing this by use of the same control levers as those which operate the throttle mechanism in the engine.

A latch mechanism, shown in detail in FIGURES 18 and 20, is actuated in the idle speed position of the lever 212 (FIGURE 19) by upward movement of the lever 214 from its lowermost broken-line position to its solid-line position. This latch 246 is adapted to enter a notch 248 in the separator plate 230 and is urged into this position early in the upward movement of lever 214 by camming action, the dog-leg 224a in link 224 engaging the latch shoulder 246a. Thus, with the reversing lever 214 in its solid-line position of FIGURE 19 the lever 212 cannot be moved in the forward direction, but is locked to the plate 230. The latch is withdrawn from the notch 248 by positive action when the lever 214 is thrown forwardly and is approaching its lowermost position. This is accomplished by the provision of a tail 246b on the opposite end of the latch, which is cammed toward the plate 230 by contact with the upper portion of the inwardly moving link 224. The reception of the link 224 in the slot 212c supports it against bending outwardly under longitudinal compression when reacting against the latch elements.

A spring-actuated detent 240 on an adjustable support 242 is urged by the spring 244 into contact with a cylindrical shoulder 180a on the side of the drum 180. The shoulder 180a has a notch 180a' therein located at such a point in relation to the position of the detent that the notch is engaged by the detent when, during power-increasing movement of the lever 214 from its lowermost broken line position in FIGURE 19 the pilot is apprised of the fact that engine power has reached a predetermined value below maximum, such as thirty-five percent of full throttle. The purpose of this detent action will be explained subsequently. The support 242 is made adjustable by the provision of a slot 242a therein and securing bolts 242b securing the support to a structural base, so that the exact point at which the detent acts may be properly established.

Returning now to the stop unit 174 and the interlock feedback mechanism which controls such unit in accordance with the position of nozzle reverser elements (52, 88, 90), it will be seen in FIGURES 12 through 16 that angular positioning of the stop element 174a is established by a control lever 250 pivoted intermediate its ends at 252 on a stationary support 254. A link 256 pivotally connected to one end of the lever 250 extends to a pivotal connection to the arm 174c, which projects approximately at right angles from collar 174b in relation to the stop element arm. The opposite end of the lever 250 carries a stop pin 258 slidably received in a guide slot 260 formed in the stationary plate 262.

The pin 258, in addition to serving as a stop adapted to contact the slot ends, serves as a pivot for a locking plate 264 which is pivotally connected at 266 to the end of a feedback control rod 268 or other lost-motion means. The pin 266 is located generally beyond the end of the lever arm which carries the pin 258 so that longitudinal movement of the rod 268 tends to swing the plate 264 on its pivot 258. Locking pins with rollers, 270 and 272, respectively, are mounted on the side of the plate 264 which lies adjacent the plate 262. These locking elements, 270 and 272, are spaced from respectively opposite sides of the line defined by the pins 258 and 266 at relative locations enabling them alternately to lodge behind the respective shoulders 262a and 262b at respectively opposite ends of the plate 262. This they do alternatively, in positions of substantial alignment with the arcuate slot 260, when plate 264 is both carried and swung in the direction toward one such shoulder or the other. This mechanism is effective as a lock preventing forces acting on the stop element 174a from moving the lever 250 out of its established position, inasmuch as either stop element 270 or 272 when engaged with a corresponding shoulder surface is generally aligned with the direction in which the pin 258 must move in order to shift the lever. However, movement of the feedback rod 268 longitudinally of itself can reverse the position of the lever 250 by first swinging the plate 264 to disengage its stop element 270 or 272 from the associated shoulder followed by swinging movement of lever 250. In the process, spring 274 has been over-centered and conditions the locking elements for engaging the opposite shoulder. Thus, if with the elements positioned as in FIGURE 13 the rod 268 is moved to the right the stop 272 is swung outwardly from engagement with shoulder 262b, whereupon continued movement of such rod draws the lever 250 in a clockwise direction through the medium of the plate 262 acting as a link. Over-centering of the spring 274 with relation to the center of pin 258 causes the stop 270 to engage behind the shoulder 262a when the rod has been advanced sufficiently to the right.

Feedback control movements of the rod 268 are effected by a lost-motion arrangement comprising stops 280 and 282 slidably mounted on the rod at locations spaced apart along its length and backed by cushioning springs 284 and 286, respectively, the ends of which are anchored by fixed collars 284a and 286a. A member 288 carried by the sleeve door 52 (FIGURE 12) has an aperture which permits slidable passage of the rod through it accompanying longitudinal movement of the door. As the door approaches its retracted or forward-thrust position the member 288 engages the stop 280 and swings the lever 250 in the counterclockwise direction as viewed in FIGURE 13. As the sleeve door moves toward the extended or reverse-thrust position it contacts the stop 282 and thrusts the feedback rod 268 in the opposite direction, to reverse the position of the lever 250. By virtue of this lost-motion arrangement, only when the thrust reverser elements in the nozzle have substantially arrived at their extended or retracted position is the stop element 174a shifted from one of its positions to the other.

The amount of take-up permitted by the springs 284 and 286 is sufficient to permit the sleeve door to complete its small remaining movement to the ultimate position without stressing the locking mechanism 260, 264.

The effect of such an interlock system including the detent and the feedback mechanism which positions a stop element in accordance with the existing position of the nozzle reverser elements will now be evident. In FIGURE 13, the position of the sleeve door 52 and associated clamshell door position (not shown in this FIGURE) is the normal or forward-thrust position. The stop element 174a is locked in a corresponding position by the mechanism including locking plate 264. The cam unit 170 is rotatably positioned by the pilot's control 180 set at the idle. This corresponds to the solid-line position of the lever 212 in FIGURE 19 and to the lowermost broken-line position of the lever 214 in that FIGURE. This is also the broken line position of the levers shown in FIGURE 17. If now the lever 212 is moved forwardly toward its solid-line position of FIGURE 17, engine power is increased by causing the cam follower 194 to be traversed by the cam riser 192c, to the maximum power of the engine in forward thrust. However, from this same starting position the engine may be conditioned for reverse thrust simply by swinging the lever 214 from its solid-line position in FIGURE 17 to its next position (B) shown by broken lines in FIGURE 19. During this range of movement of the lever 214 the cam unit 170 is rotated sufficiently to close the valve 140 and open the valve 142, thereby causing the pneumatic jacks to extend the sleeve door 52. During this movement of the control lever 214 to its position B there is no increase in engine power because the cam follower 194 is being traversed by the dwell or flat region 192a of the cam. However, the pilot is permitted to continue retracting lever 214 beyond position B, to the position C, and increase the engine power to a limited value, such as thirty-five percent of full throttle, while the thrust reverser elements are in transit to the extended position. Such a limited amount of power build-up of the engine before the reverser has completed its operation is tolerable structurally, and has the advantage that full reverse thrust can be attained much more quickly for immediate braking purposes if the engine is operating materially above idle when the throttle setting is increased.

When the lever 214 reaches position C the detent 240 engages the notch 180'a and the pilot senses at this point that he should wait a short period for the reverser elements to reach their fully extended position before he can safely increase the throttle setting to the full reverse-thrust position shown by solid lines in FIGURE 19. If he attempts too soon to move the reverse lever 214 toward the full-thrust position from position C, he will be unable to do so because of the positive restraint imposed by the stop element 174a (see FIGURE 14). However, when the pneumatic actuators have extended the sleeve door and clamshell doors, the stop element 174a is automatically shifted to its opposite position where it is now clear of the previously contacted edge of the cam and permits continued clockwise rotation of the latter (FIGURE 15) to increase engine reverse thrust to a maximum.

Should now the pilot wish to reverse the direction of thrust to the forward sense, he must follow the reverse sequence, starting with forward swinging of the reverse control lever 214. The initial phase of this movement reduces the throttle setting to the idle, which is reached when lever 214 attains position B (FIGURE 19). Thereafter, further forward and downward swinging of the lever 214 actuates the control valves 140 and 142 in the opposite sense, thereby causing the pneumatic jacks to retract the sleeve door and clam-shell doors. With the lever 214 in its lowermost position as shown by broken lines in FIGURE 19, the pilot cannot immediately increase engine power above idle since the stop element 174a is now engaged by an edge of the cam 170, preventing continued counterclockwise movement of the cam. Only when the nozzle reverser elements reach the retracted position, reversing the position of the locking plate 264 and returning the stop 174a to its position as shown in FIGURE 13, can the pilot advance the throttle control lever 212 in order to increase engine power.

A switch 300 and an indicator light 302 indicates to the pilot when the sleeve door is in the retracted position.

From the foregoing description pertaining to the nature and operation of the jet engine improvements it will be evident that the objects set forth at the outset have been attained and that the novel teachings involved are not necessarily limited to the details of the illustrative embodiment.

We claim as our invention:

1. In a reversible jet engine nozzle apparatus, a wall structure including a duct through which gases flow rearwardly from the engine, and nozzle orifice means on the aft end of said duct for the discharge of such gases in a rearwardly directed jet producing forward thrust, said orifice means comprising a constriction through which gas velocity is materially increased relative to the velocity at a location forwardly thereof, said wall structure having at least one side opening therein leading to the exterior and located forwardly of said constriction and at a longitudinal position at which gas velocity is materially below that in said constriction, a retractable flow obstruction door-like member mounted in said nozzle device to be extended therein across the path of flow at a location substantially between said constriction and said side opening to divert at least a major portion of said gases outwardly through said opening to produce reverse thrust, said door-like member being actuatable between its extended, flow-obstructing position and a retracted position wherein rearwardly flowing gases are substantially unobstructed thereby, means for so actuating said door-like member, said door-like member being mounted in the nozzle device to lie substantially parallel to the rearward direction of flow imposed over said side opening in the retracted position of such door-like member, and swingable therefrom to advance its rearward edge inwardly into the extended position of said door-like member, said door-like member being pivotally mounted to swing about a transverse axis offset materially from its center of pressure of the gases acting thereon in its extended position to produce retraction torque on such member whereby the same is adapted to be forced toward the retracted position when released, throttle mechanism for controlling engine power, and an actuating connection between said door-like member and said mechanism, operable to reduce engine power automatically in response to forced retraction of the door-like member by gas pressure upon release of the door-like member with said throttle mechanism remaining in a relatively high-power setting.

2. The nozzle apparatus defined in claim 1, and pilot-operated means controlling said actuating means and said throttle mechanism, a movable member positioned by said pilot-operated means conjointly with the positioning of the throttle mechanism thereby and movable to reposition the throttle mechanism, the actuating connection including a movable abutment element engageable with said movable member, and coupling means connected between said abutment element and the door-like member for positioning of said abutment element in predetermined relationship with said movable member for a given power setting of the throttle mechanism and with said door-like member in its extended position, said coupling means being operable to move said abutment element for engagement thereof with said movable member and to move the latter, and thereby the throttle mechanism, in a power-decreasing sense in response to movement of said door-like member toward retracted position by gas pressure.

3. In a reversible jet engine nozzle device, an annular wall structure including a duct through which gases flow rearwardly from the engine, and nozzle orifice means on the aft end of said duct for the discharge of such gases in a rearwardly directed jet producing forward thrust, said orifice means comprising a constriction through which gas velocity is materially increased relative to the velocity at a location forwardly thereof, said wall structure having openings in opposite sides thereof leading to the exterior and located forwardly of said constriction and at a longitudinal position at which gas velocity is materially below that in said constriction, a pair of arcuately curved door-like retractable baffles pivotally mounted in said nozzle device on transverse pivot axes to be extended therein across the path of flow at a location substantially between said constriction and said side openings, with at least a substantial portion of each baffle disposed rearwardly of the side openings, thereby to divert at least a major portion of said gases outwardly through said openings, said baffles being actuatable between their extended, flow-obstructing position and a retracted position lying substantially parallel to the rearward direction of flow and overlying said openings, respectively, wherein rearwardly flowing gases are substantially unobstructed thereby, means for so actuating said baffles, said pivot axes being located on the respective baffles and relative to the center of gas pressure acting outwardly thereon, to urge said baffles toward retraction upon failure of said actuator means, and retractable sleeve door means encircling said wall structure in position to close said openings, slidably mounted in the nozzle and connected mechanically to said baffles for retraction to uncover said openings conjointly with extension of said baffles, and flow guide means associated with said openings for directing said outwardly flowing gases in a forward direction to produce reverse thrust.

4. The nozzle device defined in claim 3, wherein the actuating means comprises power-operated means connected to the sleeve door at a selected location circumferentially thereon to move such door longitudinally, and through the door's connection to the flow obstruction means to extend and retract the latter, and Bowden wire means interconnecting said selected location on the sleeve door to at least one additional location thereon spaced circumferentially from said selected location, whereby a canting tendency of the door is avoided.

5. The nozzle device defined in claim 3, wherein the transverse axes of swing of the baffles are substantially perpendicular to the transverse direction of alignment of the side openings, and the device further comprises a structurally loadable strut member extending transversely across the duct and supportingly connected to the pivots for the baffles whereby outwardly acting gas pressure on the baffles creates tension loading in the strut member, said strut having opposite ends connected to the wall structure to be supported thereby, at circumferential locations thereon intermediate said side openings.

6. The nozzle device defined in claim 3, wherein the transverse axes of swing of the baffles are substantially perpendicular to the transverse direction of alignment of the side openings, and the device further comprises a structurally loadable strut member extending transversely across the duct and supportingly connected to the pivots for the baffles whereby outwardly acting gas pressure on the baffles creates tension loading in the strut member, the duct having an annular ring structure defining the rearward end thereof and the nozzle orifice means having an annular ring structure defining the forward end thereof spaced rearwardly from the first mentioned ring structure, the strut having opposite ends connected to both ring structures to be supported thereby at circumferential locations intermediate the side openings.

7. Reversible jet engine nozzle apparatus comprising a wall structure including a duct through which gases flow rearwardly from the engine, and nozzle orifice means on the aft end of said duct for the discharge of such gases in a rearwardly directed jet producing forward thrust, said orifice means comprising a constriction through which gas velocity is materially increased relative to the velocity at a location forwardly thereof, said wall structure having at least one side opening therein leading to the exterior and located forwardly of said constriction and at a longitudinal position at which gas velocity is materially below that in said constriction, a retractable flow obstruction door-like member mounted in said nozzle device to be extended therein across the path of flow at a location substantially between said constriction and said side opening to divert at least a major portion of said gases outwardly through said opening, said door-like member being actuatable between its extended, flow-obstructing position and a retracted position wherein rearwardly flowing gases are substantially unobstructed thereby, means for so actuating said door-like member, said door-like member being mounted to permit forced retraction thereof by gas pressure acting thereon when said door-like member is released, throttle mechanism for controlling engine power, abutment means movable conjointly with operating movements of said throttle mechanism, stop means engageable with the abutment means and operable when stationary to limit movement of the latter and when moved to effect movement thereof when so engaged, means interconnecting said door-like member and said stop means, positioning said stop means in one position with relation to said abutment means with the door-like member in its extended position, said abutment means and said stop means including cooperable sets of elements the relative spacings between the respective cooperating elements of which adapt the same to limit power-increasing movement of the throttle mechanism during transitions of said door-like member from one position to the other, and said interconnecting means being adapted in cooperation with said spacings, to produce power-decreasing movement of said throttle mechanism in response to retraction movement of the door-like member by gas pressure when said door-like member is released.

8. The apparatus defined in claim 7, wherein the means for actuating the door-like member comprises a control member movingly connected to said abutment means and movable therewith between opposite limits, coordinating means associated with said control member to be controlled thereby and actuatingly connected to the door-like member to effect retraction and extension thereof by movement of said coordinating means in one direction or the other from an intermediate range toward the respective opposite limits thereof, said control member being operatively connected to the throttle mechanism, and said throttle mechanism having an intermediate idle-power range and opposite limits of movement and means to increase engine power by movement of such throttle mechanism from said intermediate range toward either of such opposite limits thereof, said intermediate range of the throttle mechanism being substantially co-phased with the intermediate range of said coordinating means.

9. The apparatus defined in claim 8, wherein the interconnecting means comprises a lost-motion coupling effecting movement of the stop means from one position to the other in response to the final phase of movement of the door-like member from one position to the other.

10. Jet engine apparatus comprising, in combination with jet engine thrust reverser means movable between extended and retracted positions for changing the direction of thrust between reverse and forward, respectively, actuating means connected to said reverser means to effect such movement thereof, throttle mechanism operatively arranged to vary engine power, coordinated control means operatively connected to said actuating means and to said throttle mechanism for sequentially reducing engine power followed by reversal of the setting of said reverser means during progressive control movement of said control means in one direction or the other, respectively, movable stop means cooperating with said control means and positionable in relation thereto in either of two positions, one to limit subsequent power-increasing movement of said control means at a predetermined point upon movement of said control means sequentially to reduce power and reverse thrust in one direction, and the other to so limit said control means movement at a predetermined point upon such movement in the opposite direction, and positional feed-back means interconnecting said stop means and said reverser means and operable to reposition said stop means to permit power-increasing movement of said control means in response to thrust reversal by said reverser means.

11. The apparatus defined in claim 10, wherein the positional feed-back means comprises lost-motion coupling means interposed therein having relatively movable elements coacting to permit delay in the repositioning of said stop means during reversing movement of said reverser means, and to reposition said stop means abruptly in response to completion of thrust reversal by said reverser means.

12. The apparatus defined in claim 11, wherein the positional feed-back means further includes holding means interposed therein between said stop means and said lost-motion coupling means and having elements interengageable to hold the stop means against reversing its position, such holding being independent of the reverser means, and means operable by reversing movement of the reverser means, transmitted through said lost-motion coupling means, to disengage said latter elements for movement of said stop means.

13. The apparatus defined in claim 12, wherein the stop means and coordinating control means include cooperable elements interengageable by reversing movement of the reverser means in either direction transmitted through said lost-motion coupling means, and actuatable by such movement after such interengagement to reduce the power setting of the throttle mechanism in response to uncontrolled reversal of said reverser means.

14. The apparatus defined in claim 11, wherein the stop means and coordinating control means include cooperable elements interengageable by reversing movement of the reverser means in either direction transmitted through said lost-motion coupling means, and actuatable by such movement upon such interengagement to reduce the power setting of the throttle mechanism in response to uncontrolled reversal of said reverser means.

15. The apparatus defined in claim 10, wherein the actuating means includes fluid operated jack means actuatingly connected to said reverser means, and a source of actuating fluid therefor, and the coordinating control means comprises a pilot-operated member, cam means movable by said member, valve means controlling operation of said jack means, cam follower means operatively associated with said cam means and operatively connected to said valve means to effect retraction and extension of said reverser means by movement of said cam means in one direction or the other beyond an intermediate range.

16. The apparatus defined in claim 15, and yieldable force-producing means biasing said valve means toward a position to effect retraction of said reverser means.

17. The apparatus defined in claim 15, wherein the cam means carries spaced abutment surfaces and the stop means comprises a member interposed between said surfaces and alternatively engageable therewith.

References Cited in the file of this patent

UNITED STATES PATENTS

| | | |
|---|---|---|
| 2,664,959 | Stuart | Jan. 5, 1954 |
| 2,681,548 | Kappus | June 22, 1954 |
| 2,780,058 | Beale et al. | Feb. 5, 1957 |
| 2,847,823 | Brewer | Aug. 19, 1958 |
| 2,912,193 | Fowler | Nov. 10, 1959 |
| 2,919,545 | Tschudy | Jan. 5, 1960 |
| 2,945,347 | Colley | July 19, 1960 |

FOREIGN PATENTS

| | | |
|---|---|---|
| 739,500 | Great Britain | Nov. 2, 1955 |
| 764,907 | Great Britain | Jan. 2, 1957 |